2 Sheets--Sheet 2.
G. H. BALDWIN.
Gas-Furnaces.
No. 150,811. Patented May 19, 1874.
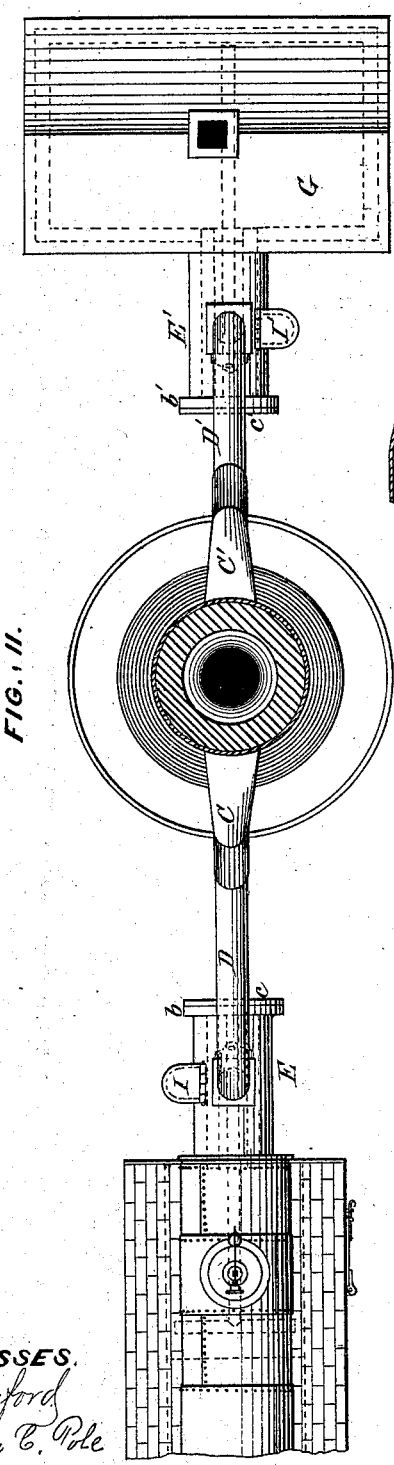
FIG. II.
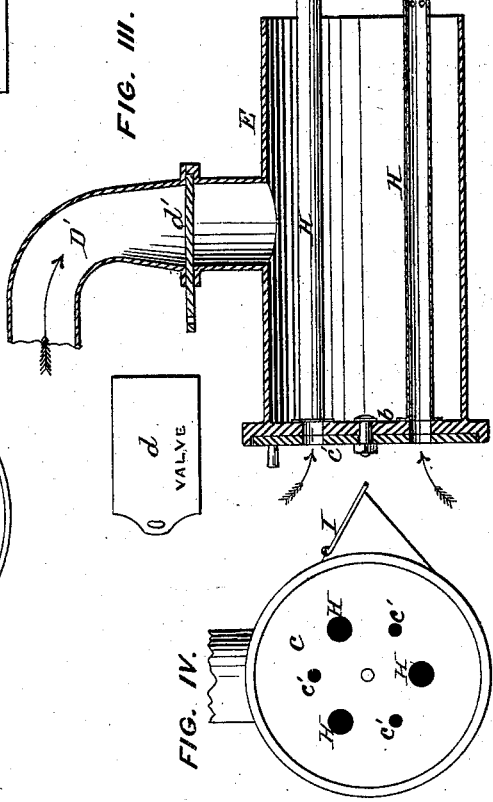
FIG. III.
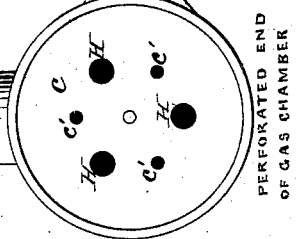
FIG. IV.
PERFORATED END OF GAS CHAMBER
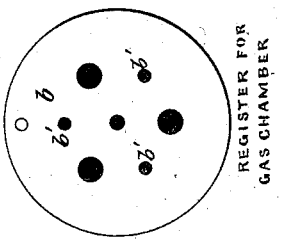
FIG. V.
REGISTER FOR GAS CHAMBER
WITNESSES.
J. H. Rutherford
Benjamin C. Pole
INVENTOR.
Geo. H. Baldwin
By Johnson & Johnson
his Attys.

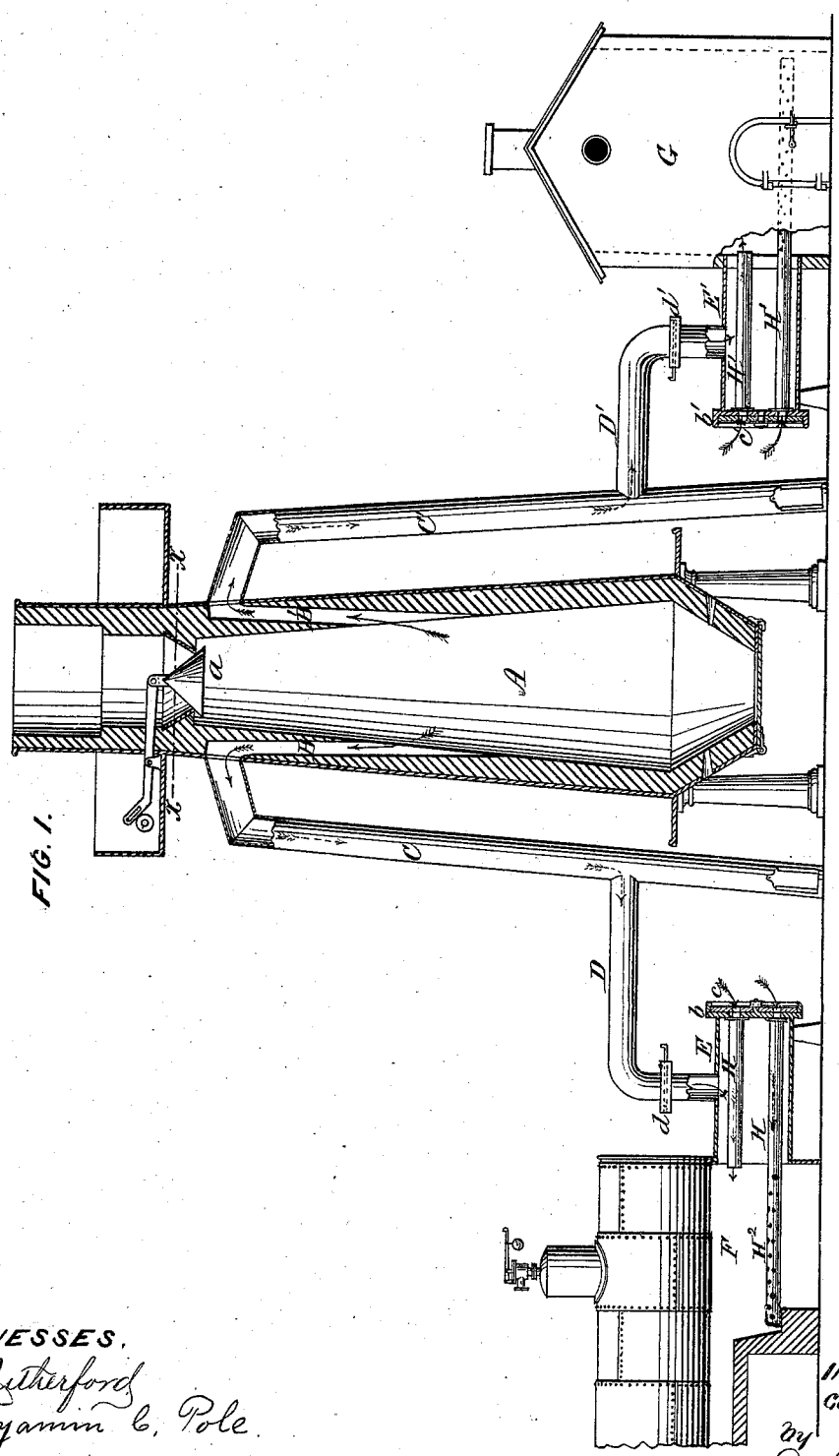

UNITED STATES PATENT OFFICE.

GEORGE H. BALDWIN, OF HOLLIDAYSBURG, PENNSYLVANIA, ASSIGNOR OF ONE-HALF HIS RIGHT TO ROBERT A. McKNIGHT, OF SAME PLACE.

IMPROVEMENT IN GAS-FURNACES.

Specification forming part of Letters Patent No. 150,811, dated May 12, 1874; application filed April 13, 1874.

*To all whom it may concern:*

Be it known that I, GEORGE H. BALDWIN, of Hollidaysburg, in the county of Blair and State of Pennsylvania, have invented certain new and useful Improvements in Blast-Furnaces, to collect and use the gases therefrom for heating purposes, of which the following is a specification:

The object of this invention is to utilize the gases and heat of blast-furnaces for the heating of hot-ovens, or to assist in the generation of steam in boilers. In carrying out this object, my invention consists in combining with the separate gas-chamber an inclined blow-open side door, which, while maintaining its closed position by its weight, will open outward automatically in the event of explosion within the gas-chamber, for the purpose of preventing the said chamber from bursting, which it is liable to do, from too great charge of the gases, and the consequent explosion thereof directly within the chamber connected with the boiler or hot-blast furnace; the design of the blow-open valve being to give instant relief to the chamber, and thereby prevent danger, by blowing open the self-closing valve, and letting out the overcharge of the gases. It further consists in the combination, with said separate gas-chamber, of air-pipes, having that portion which projects within the boiler or hot-blast furnace provided with perforations for the purpose of letting out the air in small jets, in order thereby to be more thoroughly mixed with the gases, and to cause the air to be heated before it mixes therewith, as when issuing from said pipes in compact streams it is colder, and does not so readily commingle with the gases. Also, in providing the outer head of the gas-cylinder with separate perforations, in combination with the short open air-pipes and the register, whereby air is both admitted directly into the gas-cylinder and through the short pipes; the object being to utilize the cylinder-openings to increase the draft through it to carry out the gases, while the short open pipes direct the air into the fire at the inner end of the chamber, and in this way create a draft through the gas-chamber from both ends thereof, which greatly increases the draft through the vertical pipes of the blast-furnace, and hence is of great advantage in preventing the choking of the furnace-flues.

In the accompanying drawings, Figure 1 represents a vertical longitudinal section, partly in elevation, of the blast-furnace, hot-oven, gas-receiving chambers, and pipes. Fig. 2 is a top or plan view from line $xx$. Figs. 3, 4, and 5, are detail views of the gas-receiving chamber and dampers.

In the drawing, A is the blast-furnace, provided at its mouth with a suitable damper, $a$, and door and gallery for charging the furnace. In the walls of the furnace are arranged flues B B', connecting at their upper ends with the hot-blast pipes C C', which are provided at their lower ends with sliding doors for the removal of cinders, &c. Branch pipes D D' connect with these pipes, and are provided with dampers $d$ $d'$ for closing altogether or regulating the gases to be admitted to the chambers E E' from the furnace, and which are connected either to the boiler-furnace F or hot-oven G. The heads $b$ $b'$ of the gas-receiving chambers are each provided with oscillating or sliding perforated registers or regulators $c$ $c'$, to regulate the admission of air to the gas-chambers. To the heads $b$ $b'$ are connected the air-pipes H H$^1$, which are perforated for the purpose of more thoroughly mixing the air and gases, and also to heat the air before mixing with the gases, and preventing them being cooled off by it, and also to burn the gases farther back in the boiler-furnace or hot-oven. In the sides of the gas-receiving chambers I arrange hinged doors I I', which act as safety-valves, by allowing the gases to escape from the said chambers when the pressure becomes too great by reaction, or other cause, and explosions are thereby prevented. If desired, a blowing engine or other blast apparatus may be connected to the gas-receiving chambers to force air in, if necessary, or if it is desired to force the combustion of the gases; as the current created in the pipes and gas-chambers by the withdrawal of the gases from the blast-furnace assists in withdrawing the heavy gases therefrom, and prevents the furnace from choking. A very simple manner of imparting the desired speed to the hot gases is by the use of a jet of air through the mouths of the pipes. The course of the gases and air is indicated by the arrows. The safety-doors of the gas-receiving chambers are inclined so as to maintain closed positions by their weight, and yet allow them to open instantly to relieve the pressure in case of reaction. The air-pipes are open at both ends, and may terminate at the open ends of the gas-receiving chambers, or the lower ones may be extended beyond and perforated, as shown in Fig. 1, my invention in this particular being to admit air into the cylinder at the outer end, through the openings $c'$ $b'$, to produce a draft directly through the gas-chamber, while the air issues from the short upper pipes H in compact streams at the inner end of said chamber, and thus produce a draft at both ends of said chamber to carry out the gases, and increase the draft from the blast-furnace flues. The lower pipes are not open at their inner ends, but are provided with many perforations to send out the air in jets to cause it to mingle more completely with the gases, and to become heated within the pipes.

I am aware that the gases from a blast-furnace have been combined with air, and burned in furnaces for generating steam, and that separate gas-chambers have been used as a means for carrying out such design; but my invention relates to certain features whereby the employment of the separate gas-chamber is rendered more effective for the purpose stated.

I claim—

1. The combination, with the gas-chamber E, of the automatic inclined blow-open and closing door I, as shown and described, whereby the said chamber is prevented from bursting by the explosion of the gases.

2. The combination, with the gas-chamber E, of the closed perforated pipe $H^2$, as and for the purposes described.

3. The perforations $c'$ $b'$ in the gas-chamber head and register, in combination with the short open pipes H $H^1$, as described, whereby air is admitted at both ends of said gas-chamber to increase the draft therein, and from the furnace flue.

GEO. H. BALDWIN.

Witnesses:
W. W. JACKSON,
J. A. BORDER.